US008782781B2

(12) United States Patent
Dulitz et al.

(10) Patent No.: US 8,782,781 B2
(45) Date of Patent: *Jul. 15, 2014

(54) SYSTEM FOR RECLASSIFICATION OF ELECTRONIC MESSAGES IN A SPAM FILTERING SYSTEM

(75) Inventors: Daniel Wesley Dulitz, Mountain View, CA (US); Seth Golub, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/754,523

(22) Filed: Apr. 5, 2010

(65) Prior Publication Data

US 2010/0263045 A1 Oct. 14, 2010

Related U.S. Application Data

(63) Continuation of application No. 10/882,714, filed on Jun. 30, 2004, now Pat. No. 7,693,945.

(51) Int. Cl.
G06F 15/16 (2006.01)

(52) U.S. Cl.
USPC ...... 726/22; 726/1; 726/21; 726/25; 709/202; 709/206; 709/207; 709/224

(58) Field of Classification Search
USPC ............ 726/22, 21, 25, 1; 709/206, 207, 202, 709/224
See application file for complete search history.

(56) References Cited

U.S. PATENT DOCUMENTS

| | | | | |
|---|---|---|---|---|
| 6,141,686 A * | 10/2000 | Jackowski et al. | ............ | 709/224 |
| 6,161,130 A * | 12/2000 | Horvitz et al. | ................ | 709/206 |
| 6,275,229 B1 * | 8/2001 | Weiner et al. | ................ | 715/764 |
| 6,292,942 B1 * | 9/2001 | Kennedy | .......................... | 706/47 |
| 6,330,590 B1 * | 12/2001 | Cotten | .......................... | 709/206 |
| 6,393,465 B2 * | 5/2002 | Leeds | ......................... | 709/207 |
| 6,421,709 B1 * | 7/2002 | McCormick et al. | ......... | 709/206 |
| 6,460,074 B1 * | 10/2002 | Fishkin | ......................... | 709/206 |
| 6,484,197 B1 * | 11/2002 | Donohue | ...................... | 709/206 |
| 6,496,836 B1 * | 12/2002 | Ronchi et al. | ........................ | 1/1 |
| 6,643,688 B1 * | 11/2003 | Fuisz | ............................ | 709/206 |
| 6,654,787 B1 * | 11/2003 | Aronson et al. | .............. | 709/206 |
| 6,778,941 B1 * | 8/2004 | Worrell et al. | ................ | 702/176 |
| 6,816,884 B1 * | 11/2004 | Summers | ...................... | 709/206 |
| 6,901,398 B1 * | 5/2005 | Horvitz et al. | ................ | 709/207 |
| 7,076,527 B2 * | 7/2006 | Bellegarda et al. | ........... | 709/206 |
| 7,155,484 B2 * | 12/2006 | Malik | ........................... | 709/206 |
| 7,181,498 B2 * | 2/2007 | Zhu et al. | ..................... | 709/206 |
| 7,246,121 B2 * | 7/2007 | Adar et al. | ............................ | 1/1 |
| 7,366,919 B1 * | 4/2008 | Sobel et al. | .................... | 726/23 |
| 7,395,507 B2 * | 7/2008 | Robarts et al. | ................ | 715/744 |
| 7,406,501 B2 * | 7/2008 | Szeto et al. | ................... | 709/206 |
| 7,516,182 B2 * | 4/2009 | Goldman | ...................... | 709/206 |
| 7,610,342 B1 * | 10/2009 | Pettigrew et al. | ............. | 709/206 |

(Continued)

OTHER PUBLICATIONS

"Six Degrees of Kevin Bacon," (1997), Publisher: Endless Games.

Primary Examiner — Tamara T Kyle
Assistant Examiner — Anthony Fabbri
(74) Attorney, Agent, or Firm — Morgan, Lewis & Bockius LLP

(57) ABSTRACT

A method for indicating probability of spam for email comprises tracking network traffic characteristics for the email, and comparing the tracked characteristics for the email to characteristics for email from trusted or known spam sources.

15 Claims, 8 Drawing Sheets

(56) References Cited

U.S. PATENT DOCUMENTS

| | | | |
|---|---|---|---|
| 7,657,935 B2* | 2/2010 | Stolfo et al. | 726/22 |
| 7,899,866 B1* | 3/2011 | Buckingham et al. | 709/206 |
| 8,095,602 B1* | 1/2012 | Orbach | 709/206 |
| 8,112,484 B1* | 2/2012 | Sharma et al. | 709/206 |
| 2002/0069200 A1* | 6/2002 | Cooper et al. | 707/9 |
| 2002/0078447 A1* | 6/2002 | Mizutome et al. | 725/37 |
| 2002/0087680 A1* | 7/2002 | Cerami et al. | 709/224 |
| 2002/0199095 A1* | 12/2002 | Bandini et al. | 713/151 |
| 2003/0158855 A1* | 8/2003 | Farnham et al. | 707/102 |
| 2003/0167324 A1* | 9/2003 | Farnham et al. | 709/224 |
| 2003/0167402 A1* | 9/2003 | Stolfo et al. | 713/200 |
| 2003/0191969 A1* | 10/2003 | Katsikas | 713/201 |
| 2004/0054719 A1* | 3/2004 | Daigle et al. | 709/203 |
| 2004/0073621 A1* | 4/2004 | Sampson | 709/209 |
| 2004/0078447 A1* | 4/2004 | Malik et al. | 709/206 |
| 2004/0177120 A1* | 9/2004 | Kirsch | 709/206 |
| 2004/0199592 A1* | 10/2004 | Gould et al. | 709/206 |
| 2004/0267730 A1* | 12/2004 | Dumais et al. | 707/3 |
| 2005/0015452 A1* | 1/2005 | Corson | 709/206 |
| 2005/0080855 A1* | 4/2005 | Murray | 709/206 |
| 2005/0193076 A1* | 9/2005 | Flury et al. | 709/206 |
| 2005/0198159 A1* | 9/2005 | Kirsch | 709/206 |
| 2005/0198173 A1* | 9/2005 | Evans | 709/206 |
| 2005/0262209 A1* | 11/2005 | Yu | 709/206 |
| 2006/0031464 A1* | 2/2006 | Bowman et al. | 709/224 |
| 2006/0039304 A1* | 2/2006 | Singer et al. | 370/310 |
| 2006/0085370 A1* | 4/2006 | Groat et al. | 707/1 |
| 2006/0123083 A1* | 6/2006 | Goutte et al. | 709/206 |
| 2006/0195542 A1* | 8/2006 | Nandhra | 709/207 |
| 2006/0224673 A1* | 10/2006 | Stern et al. | 709/206 |
| 2007/0106742 A1* | 5/2007 | Bellegarda et al. | 709/206 |
| 2007/0136245 A1* | 6/2007 | Hess et al. | 707/3 |
| 2008/0133672 A1* | 6/2008 | Gillum | 709/206 |
| 2008/0133676 A1* | 6/2008 | Choisser et al. | 709/206 |
| 2008/0177841 A1* | 7/2008 | Sinn et al. | 709/206 |
| 2008/0177843 A1* | 7/2008 | Gillum et al. | 709/206 |
| 2008/0256210 A1* | 10/2008 | Malik | 709/206 |
| 2009/0037537 A1* | 2/2009 | Callanan et al. | 709/206 |
| 2009/0106318 A1* | 4/2009 | Mantripragada et al. | 707/104.1 |
| 2009/0234711 A1* | 9/2009 | Ramer et al. | 705/10 |
| 2009/0259725 A1* | 10/2009 | Rabinovich | 709/206 |
| 2012/0185551 A1* | 7/2012 | Hart | 709/206 |
| 2012/0203846 A1* | 8/2012 | Hull et al. | 709/206 |

\* cited by examiner

| Condition | State | Result |
|---|---|---|
| User has accepted email from Sender | YES/NO | Stat Value |
| User has sent email to Sender | YES/NO | Stat Value |
| User has replied to email from Sender | YES/NO | Stat Value |
| User is listed as CC by Sender | YES/NO | Stat Value |
| User is listed as BCC by Sender | YES/NO | Stat Value |
| User has sent mail to CCs/BCCs | YES/NO | Stat Value |
| User has accepted mail from CCs/BCCs | YES/NO | Stat Value |
| User has received Spam from Sender | YES/NO | Stat Value |
| Malicious .exe found in mail from Sender | YES/NO | Stat Value |
| User and Sender parties of ongoing Thread | YES/NO | Stat Value |
| User and Sender members of Group* | YES/NO | Stat Value |
| User has sent mail to Group members* | YES/NO | Stat Value |
| User has accepted mail from Group members* | YES/NO | Stat Value |
| User has IM History with Sender* | YES/NO | Stat Value |
| User has had On-line Chat with Sender* | YES/NO | Stat Value |
| User has had collaboration with Sender* | YES/NO | Stat Value |
| User has IM History with CCs/BCCs* | YES/NO | Stat Value |
| User has had online Chat with CCs/BCCs* | YES/NO | Stat Value |
| User has had collaboration with CCs/BCCs* | YES/NO | Stat Value |

Statistics Table

*Fig. 4*

Network Traffic Magnitude Table

SYSTEM FOR RECLASSIFICATION OF ELECTRONIC MESSAGES IN A SPAM FILTERING SYSTEM

RELATED APPLICATIONS

This application is a continuation of U.S. patent application Ser. No. 10/882,714, filed Jun. 30, 2004, now U.S. Pat. No. 7,693,945, which is incorporated by reference herein in its entirety.

FIELD OF THE INVENTION

The present invention is in the field of communication services, and applies more particularly to methods and apparatus for filtering messages for Spam.

BACKGROUND OF THE INVENTION

In the art of filtering email for Spam messages, one standard tool that is commonly used is a compiled data list defining user-approved contact email addresses, which is a list commonly known in the art as a whitelist. A whitelist is a list of user contacts typically taken from a user's email address book and used to validate incoming email by comparing the sender address of the email to the addresses in the list. For example, if an email arrives for the user and the sender address is found in the user's whitelist of trusted contacts, then that particular email is typically allowed through to the user's inbox. If the sender's address is not in the list then the user may be alerted of possible Spam.

It is common in the art to use whitelists that are manually constructed or built from a user's address book. Whitelists, however, may be difficult to build and maintain. If a user is not diligent in maintaining a comprehensive address book, for example, the associated filtering system may not have a comprehensive list and as a result may not make good decisions.

One drawback to current whitelisting techniques is that they may be relatively inflexible in terms of contact identification. For example, in collaboration, a trusted contact might send an email that also identifies other trusted contacts through such as carbon copy (CC) and blind carbon copy (BCC) identification. However, if the user does not physically add those trusted contacts to his or her address book, then an email sent to the user from one of the trusted contacts may not get through to the user because it is not on the whitelist. Whitelists may also be inflexible in that modification (adding or deleting contacts) often is largely a manual process involving much work for a user. While some effort at automation in building whitelists has occurred in the art, that effort has typically fallen short of a goal of flexibility, as it typically involves use of keys or tags that may inadvertently be attributed to undesirable sender addresses. Additionally if a contact formerly trusted becomes a distrusted contact, the contact is typically manually removed or blocked.

Further to the above, careful observers, using tools developed for the purpose, have developed considerable knowledge of techniques used by spammers. Spam campaigns, and characteristics of their operation are tracked and recorded, and used in efforts to block spam. At the same time, spammers study the new tools and techniques used to block their efforts, and try to develop new and better techniques for overcoming the obstacles placed in their paths. Among the characteristics of spam campaigns are certain traffic characteristics that indicate a possibility that email campaigns may be spam.

Therefore, what is clearly needed in the art is a method and apparatus providing probability that certain emails or email campaigns may be spam, and used for such developed probabilities, such as from network traffic characteristics.

SUMMARY OF THE INVENTION

In an embodiment of the invention a method for indicating probability of spam for email is provided, comprising tracking network traffic characteristics for the email, and comparing the tracked characteristics for the email to characteristics for email from trusted or known spam sources. In some embodiments of the method the characteristics may include one or more of traffic volume, burstiness, number of recipients, number of purported senders, or mail recipient connection type. Tracked values may be compared with known values for trusted or distrusted sources to provide rating values for indicating trustworthiness of the tracked email.

In some embodiments the method may include an act for combining rating values associated with more than one characteristic to provide a single combined rating value. There may also be an act for using the rating value or values to trigger mail sorting functions. The mail sorting functions may include one or more of diverting emails for further testing, or destroying the emails.

In another aspect of the invention a system for filtering emails is provided, comprising a network-connected server, and intelligence operable on the server for tracking traffic-related characteristics for email and comparing tracked characteristics to characteristics for email from trusted or known spam sources. In some embodiments of the system the characteristics may include one or more of traffic volume, burstiness, number of recipients, number of purported senders, or mail recipient connection type. Tracked values may be compared with known values for trusted or distrusted sources to provide rating values for indicating trustworthiness of the tracked email.

In some embodiments the system may include an act for combining rating values associated with more than one characteristic to provide a single combined rating value. Also in some embodiments there may be an act for using the rating value or values to trigger mail sorting functions. The mail sorting functions may include one or more of diverting emails for further testing, or destroying the emails.

In yet another embodiment of the invention a machine readable medium having stored thereon a set of instructions that cause a machine to perform a method is provided, the method comprising tracking network traffic characteristics for the email; and comparing the tracked characteristics for the email to characteristics for email from trusted or known spam sources.

In some embodiments the characteristics may include one or more of traffic volume, burstiness, number of recipients, number of purported senders, or mail recipient connection type. Tracked values may be compared with known values for trusted or distrusted sources to provide rating values for indicating trustworthiness of the tracked email.

In some embodiments the method may include an act for combining rating values associated with more than one characteristic to provide a single combined rating value. In other embodiments the method may include an act for using the rating value or values to trigger mail sorting functions. Further, the mail sorting functions may include one or more of diverting emails for further testing, or destroying the emails.

BRIEF DESCRIPTION OF THE DRAWINGS

FIG. 4 is a table of possible communication activity conditions that might exist and be displayed in a template or list of statistics in accordance with one embodiment of the present invention.

DESCRIPTION OF THE PREFERRED EMBODIMENTS

In accordance with one embodiment of the present invention, the inventor provides a system for runtime classification of Spam sent in email based on evaluation of user account activity history. The methods and apparatus of the invention are described below in enabling detail according to various embodiments.

Figure 1:
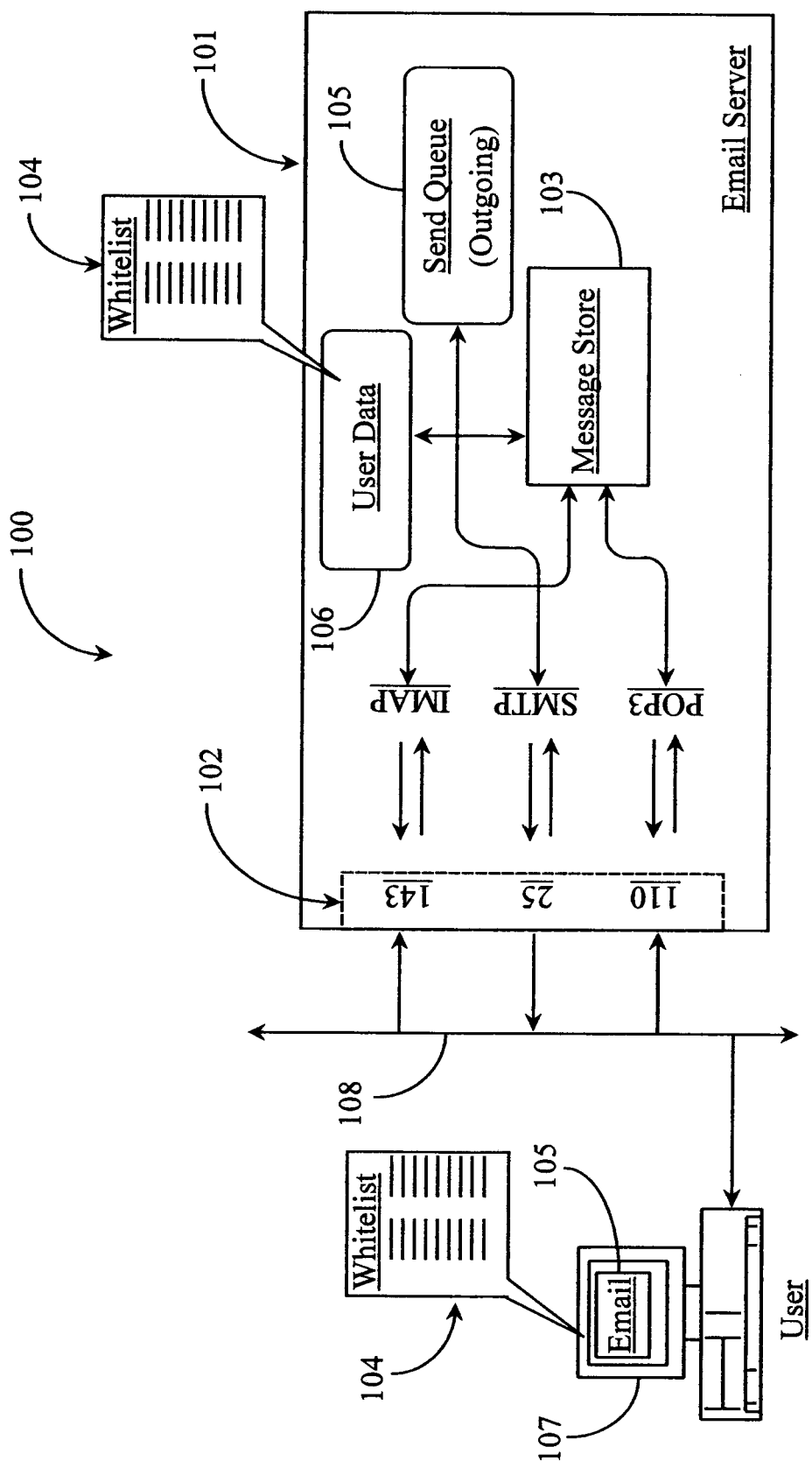
FIG. 1 is a block diagram illustrating a whitelist filtering architecture according to prior-art.

FIG. 1 is a block diagram illustrating a whitelist filtering architecture according to prior-art. As was described in the background section of this specification, whitelist filtering, as it relates to email, typically involves logically or physically blocking any emails addressed to a particular user if the listed address or sender address of the email is not listed in a whitelist of trusted contact addresses.

The prior-art architecture illustrated in FIG. 1 shows whitelist filtering between a user station 107 and an email server 101 using a whitelist 104. User station 107 may be a computer system that accesses email server 101 by physically connecting to the server over the Internet network for example. Internet connectivity between user station 107 and server 101 is illustrated herein by an Internet backbone 108 with connection to email server ports 102 from user station 107. Also typical is the use of an email client 105 on user station 107 to access the user account on server 101 for email interaction. In some cases the email account of the user operating station 107 might be Web-based wherein the user does not require an email client application in order to interact.

In the prior art ports 102 may include a Post Office Protocol (POP3) port 110, a Simple Message Transport Protocol (SMTP) port 25, and an Instant Message Access Protocol (IMAP) port 143. Port 110 may allow access for retrieving and viewing email using a desktop client 105, for example. Port 25 may allow outgoing email to be distributed to destinations outside of server 101, such as to other email servers hosted by other service providers. Port 143 may allow clientless interaction from any network-capable machine and the user interface may be a Web page. Typically, an IMAP-enhanced server may allow access through many browser applications through an ISP account. Using IMAP also may enable users to access email services from a variety of network-capable appliances.

Email server 101, as is typical of prior-art servers, may include a message store and a send queue 105. Message store 103 may typically be a text list containing separate account headings for each subscribing user, under which user messages being stored at the server may be listed. A user for the purpose of viewing and downloading email typically may access store 103. In a store and forward embodiment, store 103 may be used to store all of a user's incoming email, generally listed sequentially under the user account header. Attachments that might be sent along with messages are in many cases tagged to the messages and stored separately for download.

Send queue 105 is typically where messages are stored for send from server 101 to other server destinations. Any created outgoing mail may be deposited in queue 105 and sent out to other server destinations or, in some cases, to message store 103 if the intended recipient is a client of server 101. In this case one may assume a data connection between queue 105 and store 103 although none is illustrated.

A user operating station 107 may have a whitelist 104 associated with his or her email account with the host of server 101. Whitelist 104 typically contains identification of any contacts that the user trusts for email correspondence. In many cases a whitelist is compiled from a user's email address book associated with client 105. Whitelist 104 may be illustrated both at the location of station 107 and at the location of server 104 as part of user data pool 106. Data pool 106 typically may contain all of the user whitelist data for all of the subscribers of email server 101. Whitelist 104 may represent just one list attributed to a single user.

In a typical case whitelist 104 may be available to both station 107 and to server 101 so that a user may update first 104 and then synchronize it with the list held at server 101. In typical operation, server 101 may process incoming email for the user operating station 107 and client 105 against, hopefully, a current version of list 104 accessed by the server from user data 106 at the time of email processing. Basically it may be a sorting operation wherein any emails that do not have a "from" email address that matches an email address found on list 104 may be identified and tagged. Depending on the exact scheme, tagged messages may be labeled Spam and sorted at the time of viewing or downloaded into a junk mail folder or an equivalent set up on the user's client 105.

While some optimization may exist for automated updating or synchronization of the user's data, it may be largely the responsibility of the user to maintain an active and current list 104. The user may have to add contacts that are trusted, delete contacts that are no longer used or trusted and so on. The task of whitelist maintenance may often become an onerous task for the user and the inflexibility of the system should be readily apparent to any one with skill in the art of whitelisting technologies.

Figure 2:
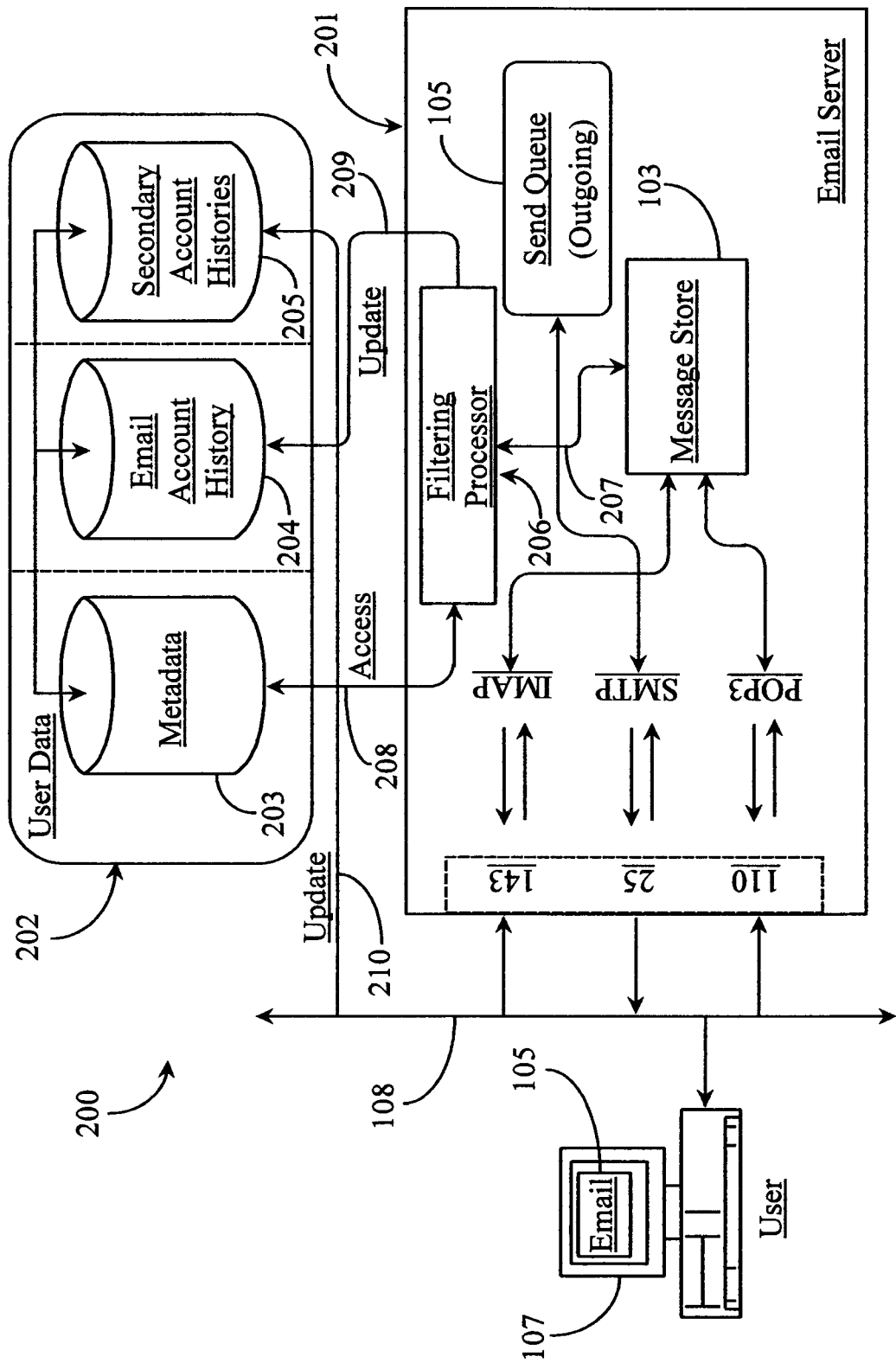
FIG. 2 is a block diagram illustrating a Spam-filtering architecture in accordance with one embodiment of the present invention.

FIG. 2 is a block diagram illustrating a Spam filtering architecture in accordance with one embodiment of the present invention. Some of the elements of this example are also present in the prior-art example of FIG. 1 above but may exist unmodified by the present invention. Such components present in both FIG. 1 and of FIG. 2, but unchanged in embodiments of the present invention, retain their original element numbers and are not reintroduced. The term Spam is defined for the present purpose as any incoming message from any sender that might be considered undesirable or not wanted to a user, including commercial unsolicited email and private unsolicited communication, among others.

In this example user 107 may use the same email client 105 and may access email using the same connection network 108 in the way described with reference FIG. 1 above. An email server 201 in this embodiment is, in the present example, enhanced for practice of the invention.

Email server 201 typically has ports 102, message store 103, and send queue 105, which may be unchanged from the description provided relative to prior art above. A user operating client 105 may access server 201 using ports 102 in the same basic fashion as described in the prior-art example above. An enhancement to server 201 in one embodiment may include provision of a filtering processor 206 that may be adapted among other functions to access user communication history data to determine whether the user will accept any particular emails addressed to him or her as legitimate emails.

Processor 206 can be a part of the processing resource of server 201 or of a separate and dedicated processor that might be built into or defined separately from server 201. Processor 206, in one embodiment, may include all of the required functions enabled by logic or software that may be required to classify a message. These functions may include but should not be limited to, an email address feature extractor or parsing module, a database access module or search function, a data aggregation module or function, and a classification logic including calculation logic to derive a weight or score from aggregated values, and logic for comparing the derived values against a threshold for Spam determination.

Processor 206 may have connection by way of a data link 207 to a message store 103 for accessing stored messages on behalf of users subscribing to filtering services. A robust user data source 202 may be provided in association with email server 201, and in one embodiment contains communication activity history data for users subscribing to the service hosted by server 201. In one embodiment, data source 202 may be a separate data store with server capability tied to server 201 for communication. In another embodiment store 202 may be physically built into server 201 using added server storage capability.

A data store 204 may in one embodiment be provided within user data source 202 and can be adapted to hold email account activity history data typically defined as past email activity for each subscribing user account. Data store 204 is typically segregated by user identification so that email history of a particular user may be classed under that particular user's identification. A metadata store 203 may optionally be provided in one embodiment as a way to optimize access to raw data held in repository 204. Metadata systems are well known in the art for indexing rich data held in data repositories, such as online data libraries or other information systems that may be accessed. Data in repository 203 may typically reference data held in repository 204.

In one embodiment of the invention, instead of a metadata store (203), a hashing function may be used, wherein email addresses are hashed and then the hash values are matched against a sparsely populated hash table where entries point to data in the historical record associated with a particular hashed email address. In this embodiment, processor 206 might be enabled to hash email addresses found in an email being processed according to a same hash formula used in the table.

In one embodiment, although not necessarily required in order to practice filtering methods of the invention, a secondary data store 205 might be provided and adapted to store account activity history. In this optional embodiment, data store 205 may contain account history defined as past communication history records of other asynchronous or synchronous communication applications that might be used in network communication. For example, an instant message (IM) application, an on-line chat application, a file sharing application, a white board collaboration tool, and other similar applications have activity histories that may be useful in identifying whether a particular email might be legitimate or illegitimate. In this optional embodiment, account history 205 may be represented along with email account history 204 in metadata store 203. In one embodiment secondary account history may also include history related to a second email account that the user may maintain with another service.

User data 202 may be time constrained to include activity history data spanning backward for a specified time period, so that history records that have aged past the window limit may be purged from the data source. For example, an exemplary time window to maintain history data for a user might be for a period of 90 days. The time period is arbitrary and may be set to any logical period of time, which may vary from user to user according to business or personal use concerns, for example.

Server 201, in terms of email activity, typically updates user data 202 over a data link 209 from processor 206 on a periodic basis. Update data may include normal email activity including any changes resulting from filtering, which may include new contact additions or deletions from the history. Secondary account history, if provided, may be updated according to a subscription model from various account service facilities that may have connection to the network. For example, a user may authorize access to his or her chat transcripts and account data created during on-line chat sessions hosted in a chat server connected to backbone 108. Likewise, peer-to-peer (P2P) activity may also be logged and accessed from the appropriate service provider. A service providing Web-meetings may be configured to summarize meeting activity and interaction among participants including isolation of the portion of the activity involving the user. The data may be updated into store 205 immediately after or, in some embodiments during the meeting session. In one embodiment a user may update repository 205 from station 107, for example, sending the summarized history of communication activity involving a secondary application launched from station 107 if such activity has been recorded.

In accordance with one embodiment of the present invention, email arriving for a user at server 201 may be accessed by filtering processor 206 and therefore may be processed against communication history statistics available from data source 202. In this embodiment, sender identification, and in some cases, CC and BCC identification expressed as email addresses, may be processed according to pre-conditional states that might become apparent from the type of data stored, the manner in which it is organized and through analyzing user communication activity history. The states or conditions referenced may be used separately or in combination along with a weighting or scoring method in order to determine a trust metric for a particular message. A value associated with the trust metric or metrics may then be used to classify the message as a legitimate message or as an illegitimate one.

History data does not necessarily have to include all of the data associated with the communication activity in order to practice embodiments of the present invention successfully. Only important and useful parameters associated with the activity might be extracted from the interaction and stored for access. For example parameters like the "from" email address, any CC, BCC email addresses, embedded email addresses, subject lines, signatures and/or any other information that might lend to successful classification might be considered.

Conditions leading to classification may take shape from the very existence of data in one embodiment. The conditions considered for email classification may revolve around a central issue defining the nature of a relationship between a user and a sender of email, as might be expressed in truths and un-truths. For example, a very basic condition applicable to a particular email being processed might be "The User has accepted email from the Sender". Another very basic condition might be "The User has replied to messages from the Sender". These two conditions may be evaluated separately or they may be combined to read "The User has accepted mail from the Sender and has replied to the Sender".

A statistical value may be derived from a single condition or from a compound condition, First the existence of the conditions with respect to account history may be quickly determined, and secondly, the number of instances of the conditions occurring over the kept history may attribute a statistical value to the conditions. A relationship between user and sender may be defined according to a hierarchy of possible conditions until it may be determined that absolutely no relationship exists at all. The conditions may be thought of as possibilities supported by one or more data tuples present in the account history that may be tied to some parameter of the email being processed.

Filtering processor 206 in this embodiment may include an ability to parse messages for common contact information that may be defined as a sender email address and any other email addresses that might be found in the CC and BCC fields of the message. In terms of email account history the email addresses extracted from a message by processor 206 might or might not appear in a user account activity record. In accordance with at least one embodiment of the present invention a measure of trust is determined for the message by attempting to associate the message with the record of past activity in some way.

In addition to email addresses, other information may be logged into the account records of store 204. For example, if a past message that was evaluated was found to contain a malicious exe., any email addresses associated with that message that match any found in the new message being processed might identify a different set of conditions and statistical values. For example two conditions might be "The User has received a malicious exe. from the Sender" and the condition "The User and Sender are part of an ongoing communication thread". These two conditions seem at face value to oppose each other, however if the conditions are combined and the value associated with the first condition is a single instance over a significant history and the value associated with the second condition is a high number, then the message may be allowed to pass. The determination in the just-mentioned example might be that the sender made a forgivable mistake and is not necessarily a malicious data source.

However, if the value of the first condition in the example just above is high (many instances logged), then the system can determine without the user's input that the particular sender is a malicious data source or is fast becoming one. In this case, the sender may be marked as a Spam source or as otherwise illegitimate for future correspondence. The fact that the user was part of an ongoing thread containing frequent messages from the sender may be mitigated by expunging the sender address but not CC or BCC addresses that may still be legitimate as sender addresses.

The more complicated second example of classification described above illustrates how the system may, in one embodiment, train itself to guard against evolving threats. By the same token, if there is absolutely no match to a sender address extracted from an email under evaluation then it does not necessarily mean that the message is illegitimate. For example, in this case it might be that a CC address matches an email address from the history record brining up the condition "The User has sent mail to a CC address listed by the Sender" and the condition "The User has accepted mail from the CC address listed by the Sender". These conditions alone suggest that the user has some perhaps legitimate relationship with the sender even though no mail correspondence has ever taken place between the sender and the user. The conditions combined may make a stronger case for allowing the message through as legitimate email.

Filtering processor 206 in this embodiment may include a capability for evaluating conditions that are found to exist for a message and a capability for combining the statistical values associated with the messages for the purpose of using the value as a combined weight or score to classify the messages. As time goes on, the system may fine-tune itself by taking into account most recent classification results, changing the statistical values associated with the possible conditions defined by the data record. Likewise as a result of continuing activity old data may be purged from the record and new data may be entered into the record reflecting the natural evolution of email activity.

The system of the invention may, in one embodiment, be combined with a permanent blocking list or blacklist technology so that addresses that continually score very low (perhaps definitely malicious) may be permanently blocked even if natural expulsion of data from the record time window erases record of the contact with those addresses.

Considering secondary account history records of data store 205 may optionally in one embodiment extend the relationship model. An email address may very often be associated with another form of communication like an instant messaging (IM) account for example. Typically a user email address may be listed in a published user profile and may even be included with the user-sent IM messages. If a user has an IM history with a sender of email that IM history may play a role in determining a measure of trust that can be attributed to the sender of an email message. Assume, for example, that a message arrives and processor 206 determines no match for sender address, CC address, BCC address or embedded email address. In simple terms, the system has never seen anything from that sender in terms of user history.

If, in this example, processor 206 checks data store 205 and determines that the sender address is listed as an address associated with an IM activity record, then the condition "The user has an IM history with the sender" might come into play. The scenario might be that the user has never corresponded with the sender using email but the user has corresponded with the sender using IM and the sender is in fact one of the user's IM buddies. The value associated with the indirect (not email) relationship between the user and the sender may be enough to allow the message through based on a measure of trust found with the existence of the IM connection. This is especially true if no other information can be determined. However, if the IM condition related to the above-described embodiment were less robust, like for example, "The sender has IM'd the user" with lack of reciprocation determined by the absence of the condition "The user has IM'd the sender", then the value statistic might deter classification of the email message as legitimate. The scenario might have been that the sender is a malicious source that first attempted to IM the user, and, having failed to get a response, is subsequently emailing the user in an attempt to compromise the user in some way.

Figure 3:
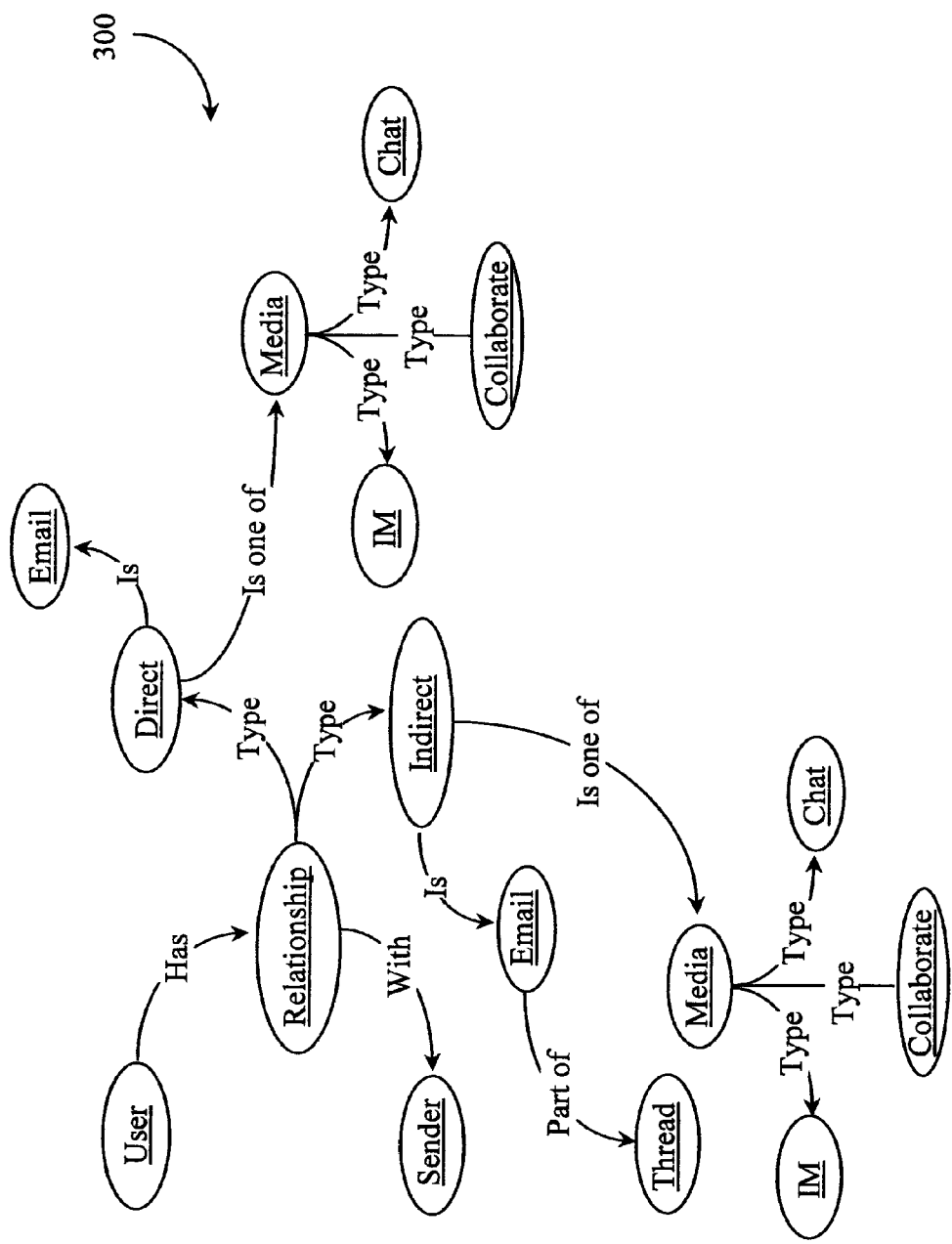
FIG. 3 is a relationship diagram illustrating an exemplary relationship hierarchy between a user and a sender in accordance with one embodiment of the present invention.

FIG. 3 is a relationship diagram illustrating an exemplary relationship hierarchy between a user and a sender in accordance with one embodiment of the present invention. The relationship diagram illustrates one of more than one possible user/sender relationship architectures for creating a relationship model that may be used to filter email.

The central notion of a relationship model is expressed in FIG. 3 in block form at the root level as User Has Relationship With Sender. In this example, the object Relationship can be of Type Direct or of Type Indirect. According to various embodiments the model of this example may be created according to different broad rules. In this example direct relationship follows a correspondence-based rule that considers direct to include correspondence in any supported media where there may be evidence of acceptance and reply on behalf of a user. Inn this same example indirect may be considered to be interaction of a unidirectional nature in any supported media type. Here is an example, "The User has received a chat invitation from the Sender" and The User has refused a chat request from the Sender" (condition set). Or perhaps, "The User has sent email to the Sender" and the absence of the condition "The User has accepted email from the Sender". In the first example of condition sets cited immediately above for chat the implication through combining the conditions implies an indirect relationship between user and sender, the relationship initiated by the sender. In the second example for email the implication is that the user has an indirect relationship with the sender, the relationship initiated by the user.

It may be seen that in the embodiment described in the above paragraph that the second example of email, where the user has initiated an indirect relationship, might carry more value then the first example for chat where the sender has initiated an indirect relationship. From the perspective of the user, the email of the chat example may likely fail to pass through while the email related to the indirect email relationship may likely be allowed through to the user's inbox.

In this embodiment, if both of the condition sets cited above were found to be true for an email, then the statistical values might be consulted to determine which response, fail or pass, would be more appropriate. For example if there were a high number of instances of the user refusing a request for chat from the sender, but only one instance of the user sending an email to the sender, then it might be determined to block the email The implication born out of the statistics might be that the user is probably annoyed by the repeated chat requests and has sent an email (a single instance), perhaps to request that the sender stop attempting to chat with him.

On the other hand if the statistics were reversed (high number of emails sent but only a single instance of refusing to accept a chat invitation), then the implication might be that the user whishes to correspond with the sender, but not through a chat interface. In this case the email would likely pass through to the user's inbox.

In this example reading the block form as labeled, a Direct Relationship Is Email or Is one of Media Type IM, Chat, or Collaborate. The objects IM, chat and collaborate simply list the supported media types and suggest the possibility that was described further above in accordance with an embodiment described with reference to FIG. 2 above that the user has secondary account history activity logged into data store 205 which may be used to help determine a classification for emails sent to the user.

It is noted in this embodiment that the same media objects are also illustrated in association with Indirect. A difference with indirect relationship determination in reference to the possible media types from direct relationship determination referencing the same media types is simply the nature of the interactions in the history being bi-directional for a media type or unidirectional for a media type. The existence of data in the history logs for each media type may determine if there is a relationship, whether indirect, direct, or both and for which media types the relationship falls under.

In another embodiment model 300 may be created according to another broad consideration. For example, the model may be media based instead of interaction based. In this case the supported media types IM, chat, and collaborate might not be associated with Direct because only activity found for email would be considered a direct relationship. Likewise, Email might not be associated with Indirect unless it is a separate email account considered a secondary account history. In the embodiment considering media type as a primary consideration instead of interaction type for a relationship definition, email interaction history of both bi-directional and unidirectional nature may be considered direct in terms of relationship.

A premise for constructing a data model that may be used by the filtering system may include other considerations in addition to the considerations described above, namely interaction-based or media-based, without departing from the spirit and scope of the invention. The considerations described in the embodiments mentioned provide useful premise for calculating weights from the conditions found to exist.

It will be apparent to one with skill in the art that in a simple embodiment in which secondary account activity may not be considered in filtering email, then model 300 might be interaction based and not media based where the only account history maintained for a user would be the subscribed email account history. However, different users may in one embodiment use different models 300 based on their personal account histories, some of which may only include the subscribed-to email account history, and some of which may be extended to include secondary account histories, the model reflecting the media types considered.

FIG. 4 is a table of possible communication activity conditions that may exist and as might be displayed in a template or list of statistics in accordance with one embodiment of the present invention. Table 400 in this example is meant to represent a useable list of possible conditions that can be derived from various combinations of data logged in a user's account history of activity. This table, in one embodiment, may be simply a visual aid for a programmer. In another embodiment it may be a useable data table of conditions which individually or in combination may be caused to execute depending upon the data that may be found in a user's history of interaction that may match contact information from an email being filtered.

In this embodiment table 400 may include a column 401 listing possible conditions; a column 402 listing states associated with conditions; and a column 403 listing results, which may be the statistical (Stat) values associated with individual conditions. Table 400 is in this example includes horizontal rows (not numbered) spanning across the columns, the rows specific to individual conditions tabled.

Reading generally from top to bottom in table 400 columns 401 in this example, a first condition reads, "User has accepted email from Sender". In the same row, in column 402 the possible state of the condition reads Yes/No meaning that the condition is found to exist for an email address or it is found not to exist. One can also consider a true/false designation instead of a yes/no designation in one embodiment. In the same row in column 403 a statistical value is displayed indicating a value that can be applied to weighting or scoring. In one embodiment a value associated with the condition "User has accepted email from Sender" might simply be the aggregate number of instances that the condition was found to be true during a time window of activity data recorded. In another embodiment the value might be a percentage figure expressing a percentage of the occurrence of the condition in relation to the total number of mails that the user has accepted during a specified time window.

A next condition in column 401 reads, "User has sent email to Sender". As described above an indication of YES/NO in column 402 and a value in column 403 on the same row gives the state yes it exists or no it does not for a given email address, and the statistical value of the occurrence if it exists. In one embodiment the first two conditions, if both true for an email address, may be combined to form one compound condition. If a condition is not found then its statistical value may be set to null or 0.

A third condition listed in column 401 reads, "User has replied to email from Sender". This condition is different from the condition listed immediately above it, in that replying to a message implies a thread. If the third condition is true then the first two conditions are also true by definition. However the second condition may be true while the first and third conditions are false.

A next condition listed in column 401 reads "User is listed as CC by Sender". The next condition reads "The user is listed as BCC by Sender". Both of these conditions may differ from the first condition in that in one embodiment they may be considered conditions defining an indirect relationship between user and sender. For example if the definition of the first condition specifies that the email is directly addressed to the user then the fourth or fifth listed condition can be true while the first condition is false. In the interest of avoiding redundancy in description, it will be apparent to the skilled artisan that the various conditions cited thus far may have relationships to each other and may be combined in various ways to obtain useful values for obtaining a reliable trust metric, which may then be used to classify a message. Other conditions listed in column 401 that have not been cited are similarly self-explanatory and one with skill in the art can readily derive interrelationships between some or many of them and can see with reference to the model 300 described with reference to FIG. 3 above how those conditions might apply in various embodiments.

Referring now to the last six conditions listed in column 401, each marked with an asterisk for isolation purposes, these conditions are those pertaining to an embodiment where secondary account histories may be available and considered. In one embodiment it might be that none of the conditions related to email are found to exist but that one or more of the conditions applying to secondary media accounts may be found to exist. In this case the particular email being processed may, in most cases, still be classified with reliability. As was previously described further above, a sender's email address or other email addresses found in a particular message being processed may in some instances be tied to secondary account activity, thus enabling classification, even though no email interaction history has been recorded between the sender and a user.

Figure 5:
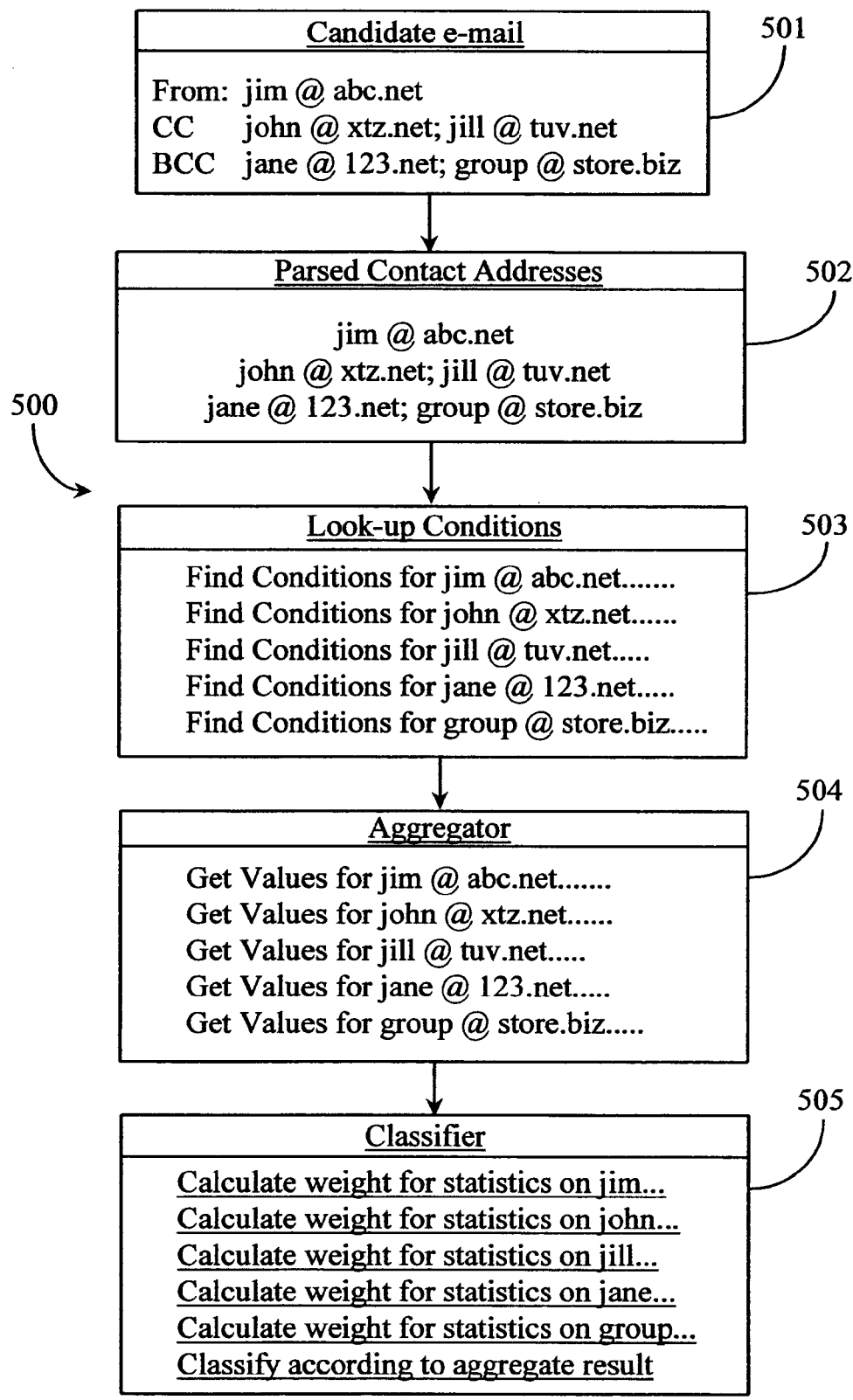
FIG. 5 is a flow diagram illustrating basic activities or acts of a processor of FIG. 1 according to one embodiment of the present invention.

FIG. 5 is a flow diagram illustrating basic activities or acts of processor 206 of FIG. 1 according to one embodiment of the present invention. In this example at act 501 a candidate email for filtering arrives. In this case there are five email addresses associated with the candidate email message. For example, in a From field the email jim@abc.net is displayed representing the sender email address. In a CC field an email address john@xtz.net and an email address jill@tuv.net are displayed. In a BCC field, the email address jape@123.net and the email address group@store.biz are displayed.

At act 502, processor 206 (FIG. 1) functions as a feature extractor or parsing module and all five email addresses, in this embodiment, are parsed from the email address fields. An email feature extractor that can also find and extract any email addresses that might be additionally provided in the email message body may in one embodiment perform the parsing. In this example, there are five addresses to consider, however in other cases there may only be one email address for consideration. In still another embodiment, there may be a quantity limit placed on the number of email addresses that can be parsed by default. Such a consideration might be implemented to protect system integrity in the event that a malicious sender sends a message loaded with an unusually high number of email addresses in an attempt to destabilize processing and efficiency.

At act 503 processor 206 functioning as a search utility (database search) accesses historical data associated with the user identified as the recipient of the email under consideration and looks up any conditions found to exist or to be true about each email address used in the lookup. In one embodiment each email address found may be used collectively as input in a single access and search function. In another embodiment a separate search may be initiated for each email address used as input. In any instance of act 503 there may be no conditions found to exist for one or more addresses input, or there may be some conditions found for one or more addresses used as input. For example, it might be that no conditions exist for jim@abc.net, but one or more conditions may exist for john@xtz.net and one or more conditions may exist for group@store.biz exist.

At act 504 in this embodiment processor 206 functions as a data aggregator and retrieves statistical values for conditions found to exist, aggregating them in one temporary memory location or cache provided to processor 206 and adapted for the purpose. At act 505, processor 206 may perform a calculation involving the aggregated values to derive a single value that may be compared against a threshold in order to classify the message being processed. In one embodiment the calculation may be driven by algorithm and may create a mean or average value from the aggregated values. In another embodiment the aggregated values may be combined according to conditions that may logically be combined, first combining the values for each condition used in combination into a single value for each combination and then calculating a single value from the combination values.

In still another embodiment, depending on the conditions that exist, single values for single conditions may be discarded if a combination of two or more existing conditions can be created, and if so, the new combined set of conditions may be given a new value assigned to that specific combination class. In a further embodiment, a combination of calculations may be optionally selected, depending on the number of conditions that exist and on the prospect of being able to combine two or more of them. It is likely in some cases that no conditions may be found to exist for a particular message. An optional embodiment described further above addresses this possibility by enabling a search of secondary account histories using the email address or addresses found as input.

Figure 6:
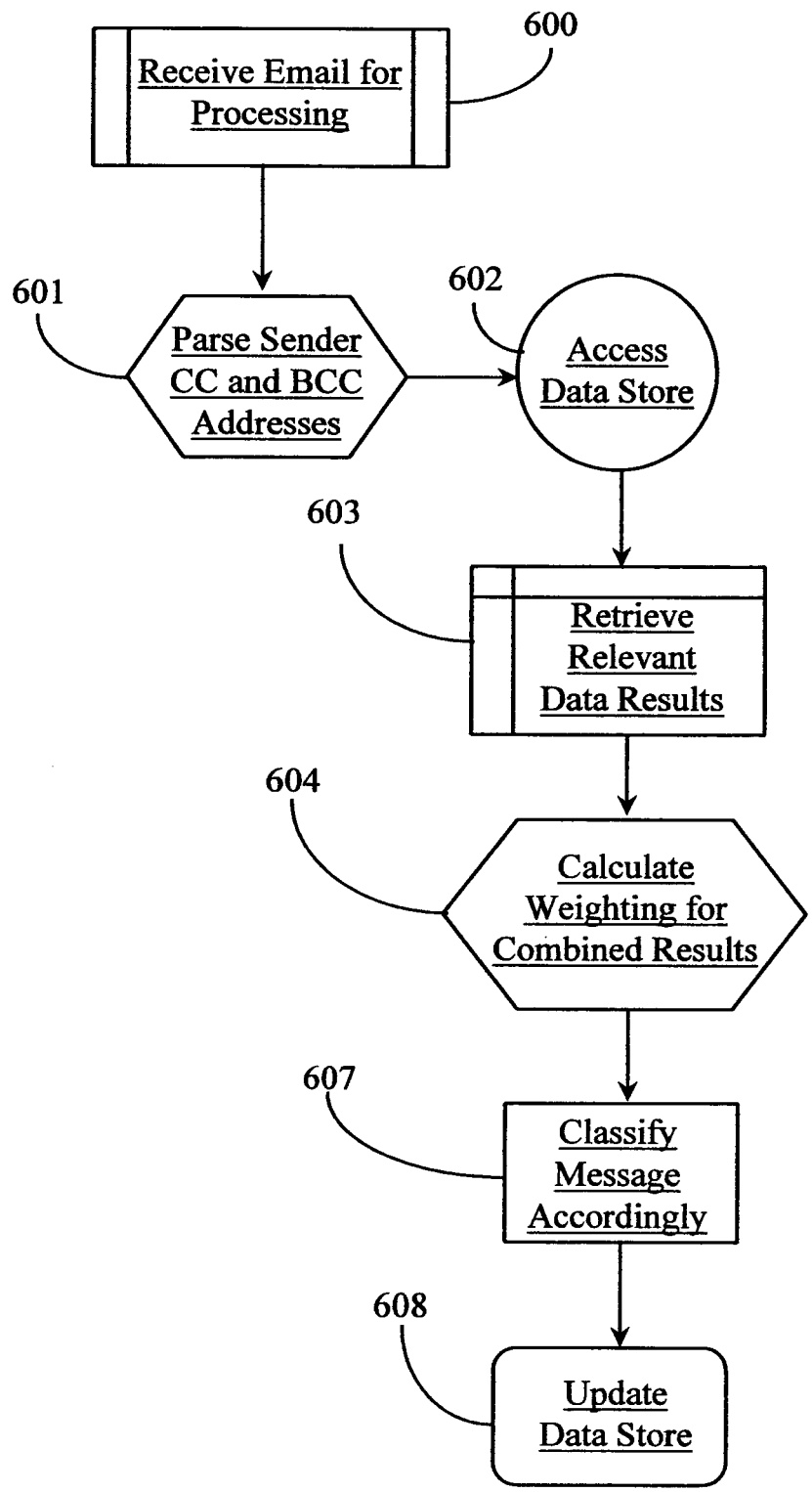
FIG. 6 is a process flow chart illustrating basic acts involved in message filtering including data updating in accordance with one embodiment of the present invention.

FIG. 6 is a process flow chart illustrating acts involved in message filtering including data updating in accordance with one embodiment of the present invention. The process described in this embodiment may or may not be performed by a single processor with reference to processor 206 described further above. The acts included herein may be performed by a combination of hardware and software implements distributed strategically within an email server system adapted for filtering according to an embodiment of the invention.

At act 600 emails arrive within an email server for processing. This step is analogous to step 501 described with reference to FIG. 5. At act 601, sender, CC, and BCC email addresses are extracted or parsed. At step 602 a data store analogous to store 202 of FIG. 2 is accessed on behalf of a client. In one embodiment email being stored for many subscribed clients may be filtered using parallel processes. That is to say that the process described herein may run in parallel with like multiple instances filtering emails many client simultaneously.

At act 603 relevant data results (values attributed to found conditions) are retrieved and stored. At act 604 calculation of one or more weights or scores may be undertaken for each message of each client. At act 607 each message being processed may be classified according to the derived value from the message. If the value falls above a threshold then the message may be classified as legitimate; if below, a threshold, then no action would likely be taken.

At act 608 pertinent results from new emails having been classified as illegitimate or Spam may be used as update data to a historical data store like data store 202 referenced in the description referencing FIG. 2 above.

Figure 7:
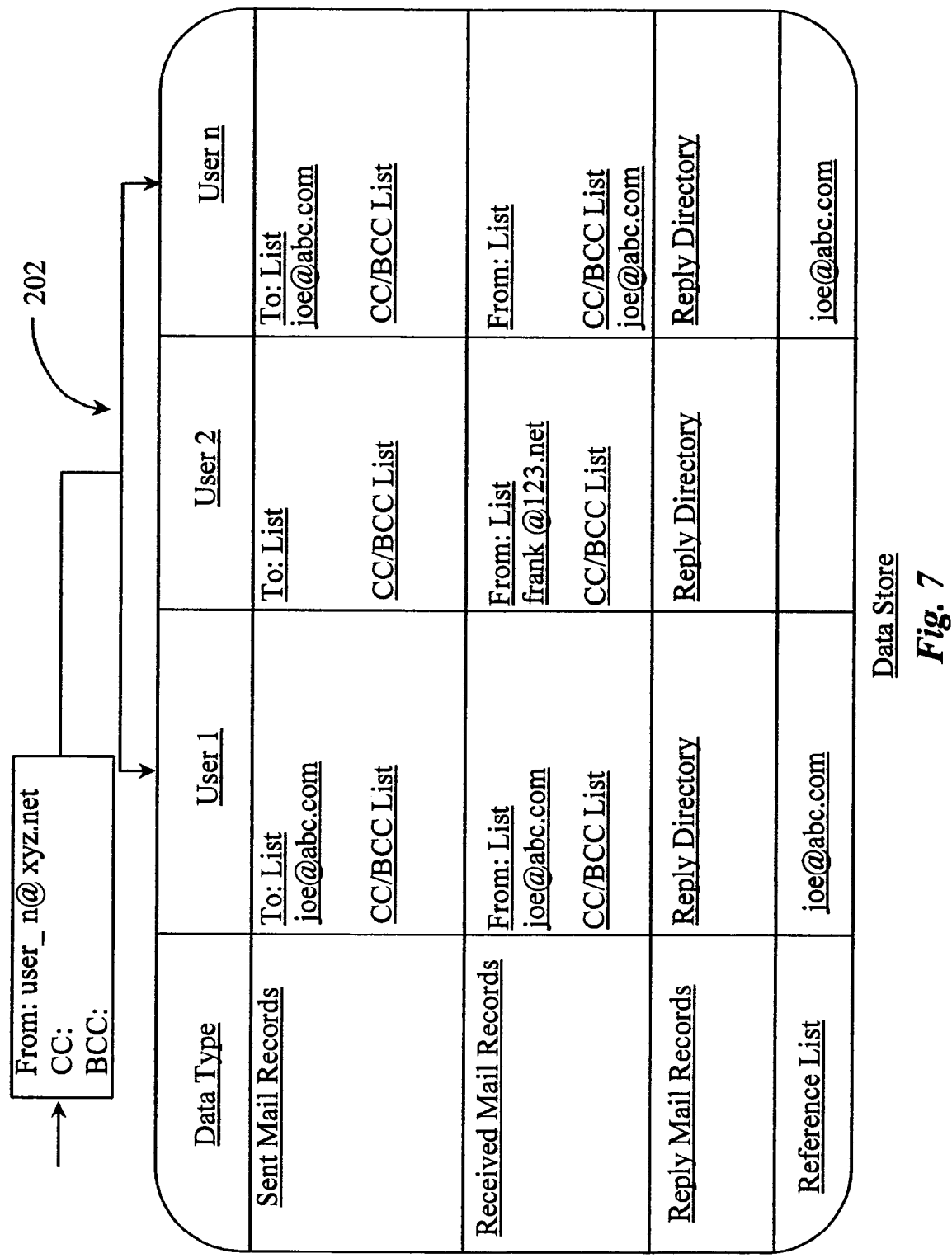
FIG. 7 is a block diagram illustrating an associative comparison of user accounts maintained in a data store for any commonality according to one embodiment of the present invention.

FIG. 7 is a block diagram illustrating an associative comparison of user accounts maintained in a data store for any commonality according to one embodiment of the present invention. In one embodiment of the invention data common to different users may be leveraged to make a classification in the event that a particular email being processed for a particular user has no hits associated with it. Data from an account history data store analogous in some embodiments to data store 202 described with reference to FIG. 2 is illustrated logically as a data table in this example to show account history of more than one user subscribed to the system of the present invention. There are three illustrated columns of data belonging to a User 1, a User 2, and a User n. In actual practice there will likely be many more subscribed users for which account histories may be maintained. The inventor deems that this illustration of the logical histories of three such users is sufficient for explanation of this particular embodiment of the invention.

Data store 202 has rows in this example that indicate exemplary data types for which history records are kept for each user identified in the columns labeled User 1, User 2, and User 3. Reading generally from left to right and top to bottom in the table, a first column labeled Data Type lists types of interaction records that are maintained and that can be associated with conditions. In a first row, sent email records are illustrated for each of users 1-n. In this row and for each column a "To" list, and a "CC/BCC" list may be maintained. The "To" list may be adapted to identify email addresses that each user has sent mail to. The "CC/BCC" list identifies email addresses that the user has referenced when the emails of record were sent to the addresses in the "To" list.

A next row identifies received email records for each user identified in columns User 1-n. Received email records may contain a "From" list and a "CC/BCC" list. The from list identifies email addresses that are sender addresses of email sent to a user. The "CC/BCC" list for this row identifies email addresses referenced by the sender in emails of record sent to the user.

A third row identifies reply mail records. This row may contain a directory or list of email addresses from senders that the user has received email from and has replied to. Reply records might also contain a CC/BCC list, although none is illustrated here. In this simplified example, assume now that an email arrives for user 1 from user_n@xyz.net. In this case, user n like user 1 is a subscriber to the filtering service of the invention. The account history data for user n is maintained in the data store as is the data for user 1. However, in this case there are no CC/BCC addresses in the message only the sender address use_n@xyz.net.

In this example, assume that user 1 has no record of any interaction with user n and relying solely on the records of user 1, the message cannot be classified. In this embodiment however the message may be classified because user n is a subscriber to the same email server as user 1, therefore account history for both accounts can be searched for conditions that might exist that can tie the two together in some way. In this case the commonality between user n and user 1 is that they both have had some relationship with a joe@abc.com. For example, user n has sent mail to joe@abc.com and has received mail from a sender where joe@abc.com was listed as a CC or BCC. User 1 has also sent mail to joe@abc.com and has accepted mail from joe@abc.com.

A bottom row labeled Reference List contains reference email addresses that are common to two or more subscribers whose account history data is maintained. The message from user n to user 1 can be classified based on conditions that exist for both user 1 and user n referencing a common email address of record. The implication might be that both parties, the sender and recipient, trust Joe, so there is a likelihood that they can trust each other.

The data and data arrangements and included data logically represented in this embodiment are exemplary of only one possible instance where a message may be classified based on cross-referencing account history data between users. Conditions, values, additional email record data and so on that might be included in a variety of arrangements (rows, and columns) or additional data types maintained are not illustrated here but may be assumed to be present in various embodiments.

In one embodiment processor 206 could track the magnitude of incoming email from servers and networks and analyze various properties to determine a value associated with the trust metric or metrics used to classify the message as a legitimate message or an illegitimate message. In particular, in one embodiment processor 206 could identify a message transmission path and filter mail based on whether the transmission path whose providence is known or unknown.

One with skill in the art of whitelisting technologies will appreciate that the methods of the invention as described in various embodiments in this specification are much more flexible both in deterring threats and accepting new contacts than are conventional whitelisting methods in the art. The user, in one embodiment, may not have to maintain a whitelist of any kind and in still another embodiment may even rely on the system to maintain his or her email address books. For example, when a new legitimate contact is accepted the system may alert the user to the possibility of adding the contact to a permanent list. Likewise, if a trusted contact is determined to become an un trusted contact due to recent evaluation, then the system, in one embodiment, may erase references to the contact in the user contact address records.

In one embodiment of the invention processor 206 may be separated into different functions which may be provided as an array of independent software components that may not necessarily reside together on a same processing component. For example, the processes that may be initiated as standalone applications might include parsing or feature extraction, search or data access, data aggregation, value calculation, value comparison against a standard threshold, message tagging, and data updating, among others.

It has occurred to the present inventor that the probability that an email or a group of emails is spam may be reckoned, at least to some extent, by the nature of traffic on the Internet from certain sources or groups of sources. In one embodiment of the present invention, therefore, certain traffic statistics and characteristics may be taken into account to determine the trustworthiness of emails.

Figure 8:
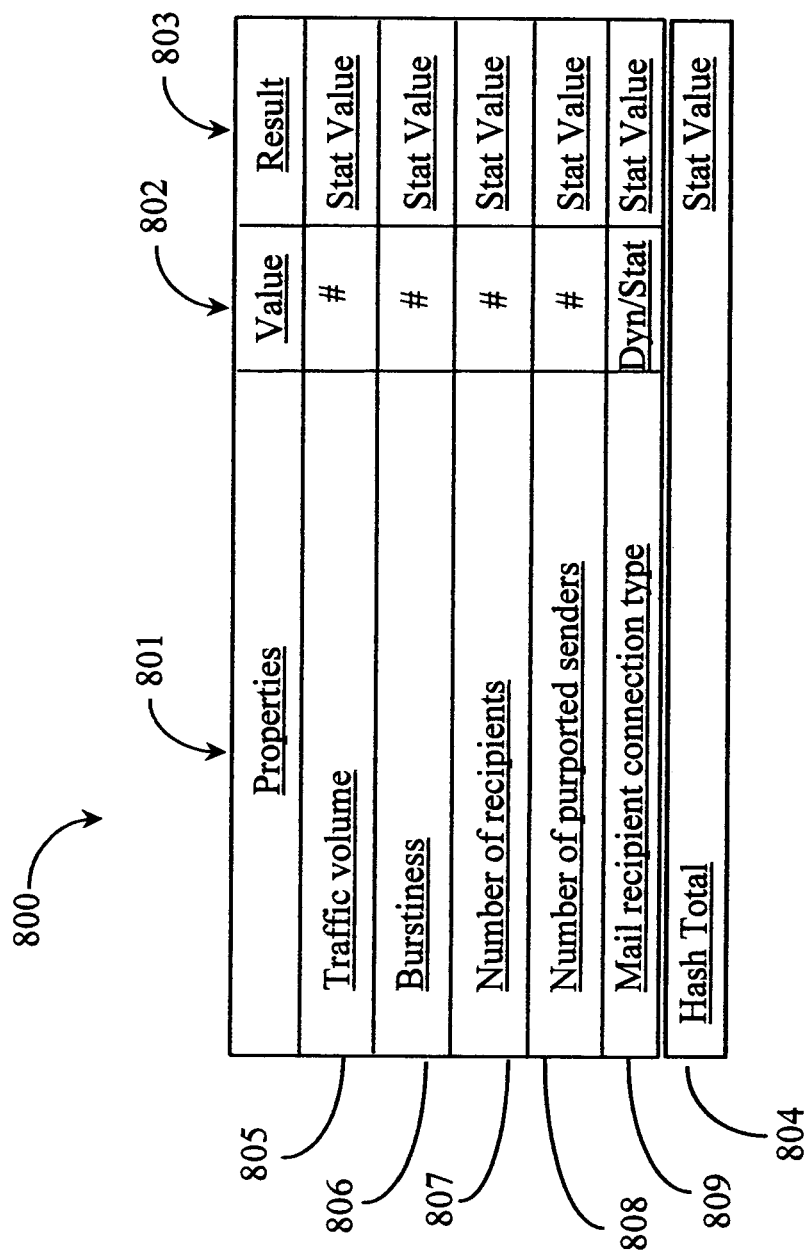
FIG. 8 is a table of network traffic activity properties in accordance with one embodiment of the present invention.

FIG. 8 is a table of possible communication network traffic activity properties that may exist and as might be displayed in a template or list of statistics for use in accordance with one embodiment of the present invention. Table 800 in this example is meant to represent a useable list of possible conditions that can be derived by monitoring network email traffic. Table 800, in one embodiment, may be associated with a suspected source of spam, may be associated with a group of sources or purported sources suspected of sending spam emails, or may simply be developed at random for a source or group of sources, and used to develop a trust metric. The trust metric, of course, may indicate a high level of trust, or, on the other end of the scale, may indicate a certainty that the source is a sender of spam emails.

There are a variety of ways such a collection of information may be used. The results may, for example, be input as a visual aid for a programmer. In some instances tables may be developed by monitoring specific sources and groups of sources and used to trigger automatic functions to automatically treat emails from the sources, the functions ranging from labeling emails with a probability of trust, diverting emails for further testing before delivery, or even destroying emails outright as certain spam.

In one embodiment table 800 may include a column 801 listing possible properties; a column 802 listing a numeric value associated with properties; and a column 803 listing results, which may be the statistical (Stat) values associated with individual properties. Table 800 in this example includes horizontal rows 805-809 for each of a spectrum of properties. It is emphasized again that the table and the properties listed are exemplary, and there may be other useful traffic properties that may be combined with those described below with reference to FIG. 8, or that may be used instead of those described.

Row 805 in this example is for "Traffic volume". Column 802 for traffic volume is in this example a numerical value for traffic volume measured in a specific time period. This value may be a snapshot of volume at any point in time, for example, as emails per minute, of a number of emails detected from a source or source group over some other time period. This number represents the momentary traffic volume arriving at email server 201 (FIG. 2).

Column 803 for traffic volume is a statistical value (Stat value), which may be a normalized or canonicalized value derived from the value in column 802. The column 803 value may be, for example, a numerical value from 1 to 10 indicating a relative traffic volume over time normalized to know spam volumes, and so on. There are a broad variety of possibilities.

Row 806 is for a property related to burstiness. Burstiness may be defined as the way that email volume relative to time may vary. For example, if traffic does not vary over time the value for burstiness would be very low. On the other hand, if there are periods of no activity, and intervening periods of high traffic volume, burstiness value would be high. The value in column 803 for burstiness may then be a normalized or canonicalized value for burstiness according to known burstiness characteristics for known spam sources and known trusted sources.

Row 807 is for "Number of recipients in this example. In one embodiment this property could reflect the total number of recipients to whom a particular email or group of emails is addressed; in another embodiment this property could reflect the number of recipients to receive this mail on email server 201. Again, column 802 may be a specific value, and column 803 may be a normalized value based on known or theorized characteristics for such a property, related to known spam sources or trusted sources.

It is known that spammers often counterfeit sender identification to create a greater trust metric for their emails. Spammers may also, in a single campaign, use a multiplicity of counterfeit senders. Therefore, a metric relative to senders and number of purported senders may be useful in establishing a probability that an email or a group or burst of emails is spam. In FIG. 8 line 808 is for a metric labeled "Number of purported senders". Columns 802 and 803 may then list an actual value for a source or a group of sources, and column 803 a value based on the value of 802 reflecting known spam and/or trusted sources.

Row 809 in this example is for "Mail recipient connection Type". Column 802 for this line in the example table reflects whether the mail recipient is on a dynamic or static network IP address connection. A mail recipient with a static IP address will retain the same IP address each time they are connected to the internet; a mail recipient with a dynamic IP address may or may not have the same address each time they are connected to the internet. A Column 803 in this example could contain a metric reflecting the trustworthiness of the sender of the mail based on whether the recipient is using a dynamic or static IP address to connect to email server 201.

Row 804 of the exemplary table of FIG. 8 is for a hash total, or other derived stat value based on the normalized or canonocalized values for some or all of the properties in rows 805 through 809. Depending upon the relationship basis used to develop the values, the final derived value could be as simple as a total of the stat values in column 803 for rows 805 through 809. Many other relationships might be used as well. The final value is to be a value that can be used to reflect the probability that emails from real or purported sources may or may not be spam.

The final value derived for row 804 may be used in a variety of ways. The value may be an indicator for an administrator or other worker to combine with personal judgment in making decisions regarding emails and email campaigns. In other cases, in a more automated environment, the final derived value may be used to trigger one or more automated functions as previously described above. For example, in one embodiment, it may have been empirically developed that a number greater than a certain threshold is a solid indication that the emails monitored are spam and a function may be triggered to simply eradicate all the emails in the known campaign.

It will be appreciated by those skilled in the art that the invention is not limited to the exemplary embodiments described, and may be implemented with some, or a combination of the described or other features without departing from the spirit and scope of the invention, and many details of embodiments described may be altered appreciably also without departing from the spirit and scope of the invention. The invention is to be limited therefore only to the scope of the following claims.

What is claimed is:

1. A computer implemented method for filtering emails on a server system having one or more processors and memory storing one or more programs for execution by the one or more processors, comprising:
    receiving an email to a recipient from a sender;
    in response to receiving the email:
    determining whether there is a direct relationship between the sender and the recipient; and (i) when no direct relationship between the sender and the recipient is found, searching for an indirect relationship between the sender and the recipient, and utilizing the existence of the indirect relationship, when found, for determining a spam probability of the email by evaluating statistical information regarding the historical electronic interactions associated with the sender; and (ii) when a direct relationship between the sender and the recipient is found, determining a spam probability of the email by evaluating statistical information regarding the historical electronic interactions between the recipient and the sender using one or more non-email applications; and classifying the email according the identified spam probability.

2. The computer implemented method of claim 1, wherein determining the spam probability further comprises:

combining historical electronic interactions from an email application and historical electronic interactions from the one or more non-email applications to produce a combined condition; and identifying the spam probability of the email based at least in part on the combined condition.

3. The computer implemented method of claim 1, wherein identifying the spam probability further comprises:

identifying the spam probability of an email based on historical electronic interactions between one or more additional recipients and the sender.

4. The computer implemented method of claim 1, wherein the one or more non-email applications includes a plurality of: an instant messaging application, an on-line chat application, a file-sharing application, and a collaboration application.

5. The computer implemented method of claim 1, wherein:

the statistical information relating to previous interactions between the recipient and the sender includes one or more of the following: types of interaction and frequency of interaction.

6. A system, for filtering emails, comprising:

at least one processor; and memory storing one or more programs to be executed by the at least one processor;

the one or more programs comprising instructions for:

receiving an email to a recipient from a sender;

in response to receiving the email:

determining whether there is a direct relationship between the sender and the recipient; and (i) when no direct relationship between the sender and the recipient is found, searching for an indirect relationship between the sender and the recipient, and utilizing the existence of the indirect relationship, when found, for determining a spam probability of the email by evaluating statistical information regarding the historical electronic interactions associated with the sender; and (ii) when a direct relationship between the sender and the recipient is found, determining a spam probability of the email by evaluating statistical information regarding the historical electronic interactions the recipient and the sender using one or more non-email applications; and classifying the email according the identified spam probability.

7. The system of claim 6, wherein instructions for determining the spam probability further comprises instructions for:

combining historical electronic interactions from an email application and historical electronic interactions from the one or more non-email applications to produce a combined condition; and identifying the spam probability of the email based at least in part on the combined condition.

8. The system of claim 6, wherein instructions for identifying the spam probability further comprises instructions for:

identifying the spam probability of an email based on historical electronic interactions between one or more additional recipients and the sender.

9. The system of claim 6, wherein the one or more non-email applications also includes a plurality of: an instant messaging application, an on-line chat application, a file-sharing application, and a collaboration application.

10. The system of claim 6, wherein:

the statistical information relating to previous interactions between the recipient and the sender includes one or more of the following: types of interaction, media of interaction, and frequency of interaction.

11. A non-transitory computer readable storage medium storing one or more programs configured for execution by a computer, the one or more programs comprising instructions for:

receiving an email to a recipient from a sender;

in response to receiving the email:

determining whether there is a direct relationship between the sender and the recipient; and (i) when no direct relationship between the sender and the recipient is found, searching for an indirect relationship between the sender and the recipient, and utilizing the existence of the indirect relationship, when found, for determining a spam probability of the email by evaluating statistical information regarding the historical electronic interactions associated with the sender; and (ii) when a direct relationship between the sender and the recipient is found, determining a spam probability of the email by evaluating statistical information regarding the historical electronic interactions between the recipient and the sender using one or more non-email applications; and classifying the email according the identified spam probability.

12. The non-transitory computer readable storage medium of claim 11, wherein instructions for determining the spam probability further comprises instructions for:

combining historical electronic interactions from an email application and historical electronic interactions from the one or more non-email applications to produce a combined condition; and identifying the spam probability of the email based at least in part on the combined condition.

13. The non-transitory computer readable storage medium of claim 11, wherein instructions for identifying the spam probability further comprises instructions for:

identifying the spam probability of an email based on historical electronic interactions between one or more additional recipients and the sender.

14. The non-transitory computer readable storage medium of claim 11, wherein the one or more non-email applications also includes a plurality of: an instant messaging application, an on-line chat application, a file-sharing application, and a collaboration application.

15. The non-transitory computer readable storage medium of claim 11, wherein:

the statistical information relating to previous interactions between the recipient and the sender includes one or more of the following: types of interaction and frequency of interaction.

\* \* \* \* \*

UNITED STATES PATENT AND TRADEMARK OFFICE
CERTIFICATE OF CORRECTION

PATENT NO. : 8,782,781 B2
APPLICATION NO. : 12/754523
DATED : July 15, 2014
INVENTOR(S) : Dulitz et al.

It is certified that error appears in the above-identified patent and that said Letters Patent is hereby corrected as shown below:

In the Claims

Claim 1, col. 17, line 15, please delete "according the" and insert --according to the--; and Claim 6, col. 17, line 63, please delete "according the" and insert --according to the--; and Claim 11, col. 18, line 43, please delete "according the" and insert --according to the--.

Signed and Sealed this
Seventh Day of October, 2014

Michelle K. Lee
*Deputy Director of the United States Patent and Trademark Office*